(12) United States Patent
Lester et al.

(10) Patent No.: US 8,549,652 B1
(45) Date of Patent: Oct. 1, 2013

(54) DOCUMENT ORIGIN DESIGNATOR

(75) Inventors: James L. Lester, Dublin, CA (US);
Peter Sorotokin, Cupertino, CA (US)

(73) Assignee: Adobe Systems Incorporated, San Jose, CA (US)

( * ) Notice: Subject to any disclaimer, the term of this patent is extended or adjusted under 35 U.S.C. 154(b) by 774 days.

(21) Appl. No.: 12/615,878

(22) Filed: Nov. 10, 2009

(51) Int. Cl.
*G06F 7/04* (2006.01)
*G06F 17/30* (2006.01)
*H04N 7/16* (2011.01)

(52) U.S. Cl.
USPC ............................................ 726/26; 715/273

(58) Field of Classification Search
None
See application file for complete search history.

(56) References Cited

U.S. PATENT DOCUMENTS

| | | | |
|---|---|---|---|
| 6,216,228 B1* | 4/2001 | Chapman et al. | 713/176 |
| 8,073,915 B1* | 12/2011 | Nandy | 709/206 |
| 2006/0075241 A1* | 4/2006 | Deguillaume et al. | 713/176 |
| 2008/0259403 A1* | 10/2008 | Yaguchi et al. | 358/3.28 |
| 2009/0217344 A1* | 8/2009 | Bellwood et al. | 726/1 |

* cited by examiner

*Primary Examiner* — Nadia Khoshnoodi
(74) *Attorney, Agent, or Firm* — Kilpatrick Townsend & Stockton LLP

(57) ABSTRACT

A document rights management system (DRM) defines an unrenderable origin designator in a media item that does not display or alter the physically rendered version of an instantiation of the media item. The unrenderable designator does not appear as an obscured or occluded feature in a printed or displayed versions. The rendered version is unaffected by the unrenderable designator because it does not result in any displayable features. The unrenderable designator is stored in a display list of the media item and appears as an attribute of objects such that the function to cause the display object to be undisplayable, or unrenderable, are not immediately apparent. The DRM system encodes a designator in an attribute of a display object for rendering according to a media rendering format such as PDF, such that the designator causes the display object to be unrenderable and indicates the origin of the media item.

14 Claims, 6 Drawing Sheets

DOCUMENT ORIGIN DESIGNATOR

BACKGROUND

For many years vendors of reproducible media have been concerned with unauthorized duplication of media products such as music recordings, computer software, and published works, to name several. Early software producers employed anti-copy techniques including "bad sectoring" which employed a corrupt segment in a delivered original. More recently, validation codes have been employed to register a machine specific hash with a particular installation of an operating system to ensure each delivered copy of physical media was installable on a single machine. Movie producers at one time feared that home video recorders would cause the demise of the motion picture industry, and began generating "uncopyable" tapes which would play acceptably but not generate a recordable signal for other machines to copy.

Mechanisms evolved to identify unauthorized or undesired propagation and distribution of media items. The study of steganography encompasses the practice of hidden or obscured messages in printed and visible works, and includes outright cryptography and other ciphers which render the media unintelligible. Unlike cryptography, however, steganographic techniques in general do not necessarily obliterate the underlying media item, and therefore does not draw attention the way encryption does. Therefore, while steganographic implementations may inject either readily visible or more obscured artifacts in the underlying media item, they generally do not prohibit intelligible reception by the user, but rather continue to merely denote the source or origin of the media item.

SUMMARY

Conventional Document Rights Management (DRM) systems include provisions for identifying the origins of instantiations of particular media item, such as a document, song, or video clip/movie. Techniques known as watermarking, already widespread to prevent unauthorized duplication of financial instruments such as checks and currency, are also employed in an electronic context. For publishers of document based materials, watermarks gained popularity as a mechanism of deterring unauthorized duplication. Once employed only for physical copies of government issued instruments, such as drivers licenses and currency, the concept has been adapted for electronic media. A watermark is an embedded token in a document to identify the origin of the particular copy or instantiation. While a watermark may be visible or hidden, a common premise is that substantial effort is required for duplication of the content without also duplicating the watermark. Hence, the watermark is carried with successive instantiations to maintain the tie to the original source. Visible watermarks are visible in a rendered copy, often as a diagonal half tone phrase or insignia across a rendered area.

In a particular configuration employing an encoded origin designator as disclosed herein, a content server is available to potential purchasers as a bookserver. Internet content providers such as Amazon® and Barnes and Noble® provide electronic versions of book documents, and also allow sampling by rendering selected subsets of the media item. From a provider standpoint, electronic sales are desirable, however the provider benefits from a DRM that can provide assurances that wrongfully disseminated copies of a particular media item were not attained through a breach of the providers DRM. Frequently, such unfortunate discoveries may emanate from a disgruntled publisher accusing the content provider of contributory infringement. In such a scenario, the provider has only the wrongfully obtained copy (file) from which to show that it's DRM was not breached. The disclosed watermark that is both unrenderable and hidden serves this purpose.

Publishers of large volumes of documents often employ a such document rights management (DRM) system for managing watermarks and other mechanisms for denoting and tracking the origin of a document or other media item to identify subsequently rendered copies, often as a deterrent to unauthorized distribution. Invisible watermarks are beneficial because they are difficult to verify "stripping" of the watermark, thus not alerting the unauthorized copier that they have successfully broken the DRM system. Further, appearance of subsequent copies are easier to trace to sources if the invisible watermark remains, while visibly renderable watermarks are easier to strip and verify, leaving subsequent copies agnostic to the source.

Unfortunately, conventional DRMs suffer from the shortcoming that identification of inappropriately duplicated instantiations relies on physical changes to the rendered output. Conventional steganography techniques purport to provide instantiation specific markings by making subtle, minute changes to the rendered version. For example, a particular conventional mechanism adds vertices to a rendered figure either by breaking existing vertices into multiple segments which add to the original vector, or by overwriting a vector or portion with a similar vector such that the appearance is the same. Conventional mechanisms also include so-called "jittering," which displaces vertices a small increment such that the vector position is slightly different but the visual perception is sufficiently small to avoid detection. However, such approaches alter the physically rendered version, whether on screen or paper medium, and can cause subsequent inconsistencies with the physically rendered instantiation. Configurations herein are based, in part, on the observation that certain attributes of a display object in a media item may be manipulated or assigned a value to result in the display object being completely undisplayed.

Accordingly, configurations herein substantially overcome the shortcomings of conventional watermarking and other DRM identifiers by defining an unrenderable origin designator (designator) in a media item that does not display or alter the physically rendered version of an instantiation of the media item. In other words, the unrenderable designator does not appear as an obscured or occluded feature in a printed or displayed versions; rather the rendered version is unaffected by the unrenderable designator because it does not result in any displayable features. The unrenderable designator is stored in a display list of the media item and appears as an attribute of objects such that the function to cause the display object to be undisplayable, or unrenderable, are not immediately apparent.

In further detail, in accordance with the claimed approach, the DRM system encodes a designator in an attribute of a display object, in which the display object is configured for rendering according to a media rendering format such as PDF® (Portable Document Format, marketed commercially by Adobe® Systems Incorporated, of San Jose, Calif.), and invokable with a suitable rendering application for generating a user visual display of the display object. The DRM system adds or inserts the attribute having the encoded designator into a display object in a display list of a media item, such that the display list includes a set of display objects and each display object has a list of attributes. The rendering application is responsive to the attributes for rendering each of the display objects in a rendered form of the media item, such that the designator causes the display object having the designator to be unrenderable by the rendering application and is further indicative of the origin of the media item. A subsequent attempt to render the media item having the encoded origin designator invokes the rendering application for rendering the media item, and iterates through each of the display objects of the media item. Since the unrenderable display object having the encoded origin designator (designator) has no effect on the rendering of the media item in the rendering area, the rendering application omits changes in the rendered display resulting from the display object having the designator, but he designator is nonetheless detectable by DRM logic to identify the origin of the copy.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A document rights management system manages information relating a disseminated instantiation (copy) of a document with the origin of that instantiation. The identity of the origin is often expressed as an encoded origin designator such as a watermark that identifies the origin without significantly obscuring the identified document, but that is difficult to remove without affecting the appearance of the rendered document. Various document formats, such as PDF®, MSWord® and Wordperfect® may include an encoded origin designator, as well as other visibly renderable media such as graphical displays, slide presentations, and video. Disclosed below are an example usage of the encoded origin designator in a PDF document distributed in a managed application environment as part of a DRM implementation. In the particular configuration discussed herein, PDF files are particularly amenable to this process because the display list corresponding to the rendered PDF is rather dense and a display object with an unrenderable feature does not draw undue attention amid other display objects, hence it is difficult for a would-be copier to identify the watermark (designator) as such.

Figure 1:
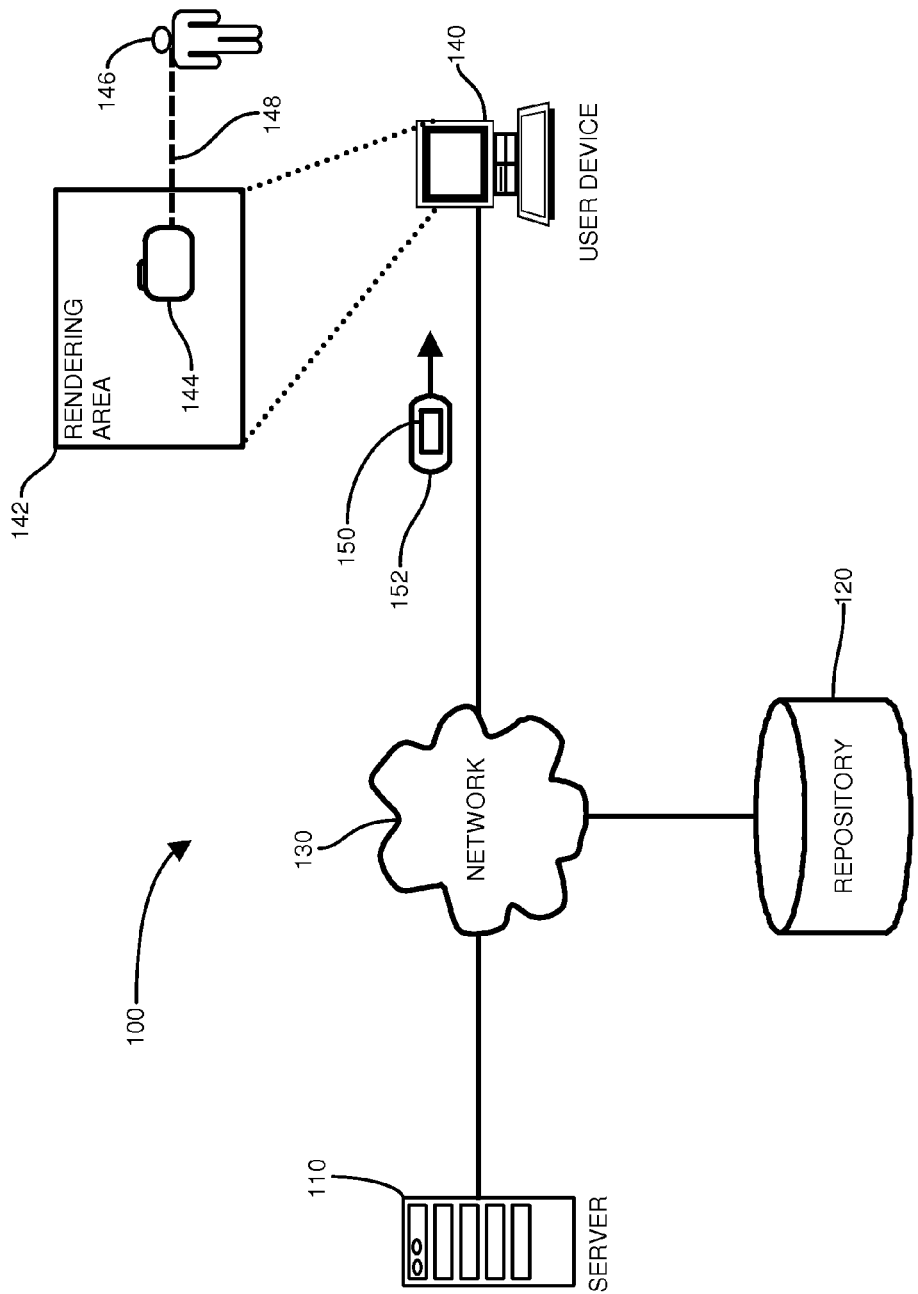
FIG. 1 is a context diagram of a managed application environment suitable for use with the present configuration.

FIG. 1 is a context diagram of a managed application environment 100 suitable for use with the present configuration. Referring to FIG. 1, the managed application environment 100 includes a server 110 coupled to a network 130 for delivering media items from a repository 120. The server 110 and repository 120 may be collocated on the same node or may be remote via the network 130; the network 130 may be any suitable mechanism for internode interconnection such as the Internet, LAN, WAN, WiFi, or any other suitable network infrastructure. The server 110 is invoked by a user device 140 for delivering and/or rendering a media item 152, such as a document, slide show, movie, song, or other electronic media item adapted for delivery via the network 130. The media item 152 includes an encoded origin designator 150 for identifying the origin of the media item 152, discussed further below. The user device 140 includes a rendering area 142, typically a video screen, for displaying rendered objects 144 from the media item 152 such that they are viewable by a user 146, shown by dotted line 148. The rendering area 142, as applied in the example herein, illustrates a visual perception mode for exemplifying embodiments of the encoded origin designator claimed herein, however alternate rendering mechanisms such as audio may be applicable as well.

Configurations herein employ the encoded origin designator 150 (designator) for specifying the entity from which the media item 152 emanated, which may be the server 110 or may be a prior originator in a chain of propagation. Generally, however, it is difficult to reproduce the media item 152 without also reproducing the encoded origin designator 150, thus the designator 150 serves as a perpetual indication appurtenant to the media item 152. Such an encoded origin designator 150 is often manifested in a so-called watermark, an artifact that does not occlude the viewable media to which it is affixed. While some watermarks are visible to the casual viewer in a non-intrusive manner with the media item 152, the designator 150 is carried with the media item 152 in a manner that it is not rendered with the media item 152, however is detectable upon inspection by a predetermined detection mechanism, now discussed with respect to FIGS. 2-6.

Figure 2:
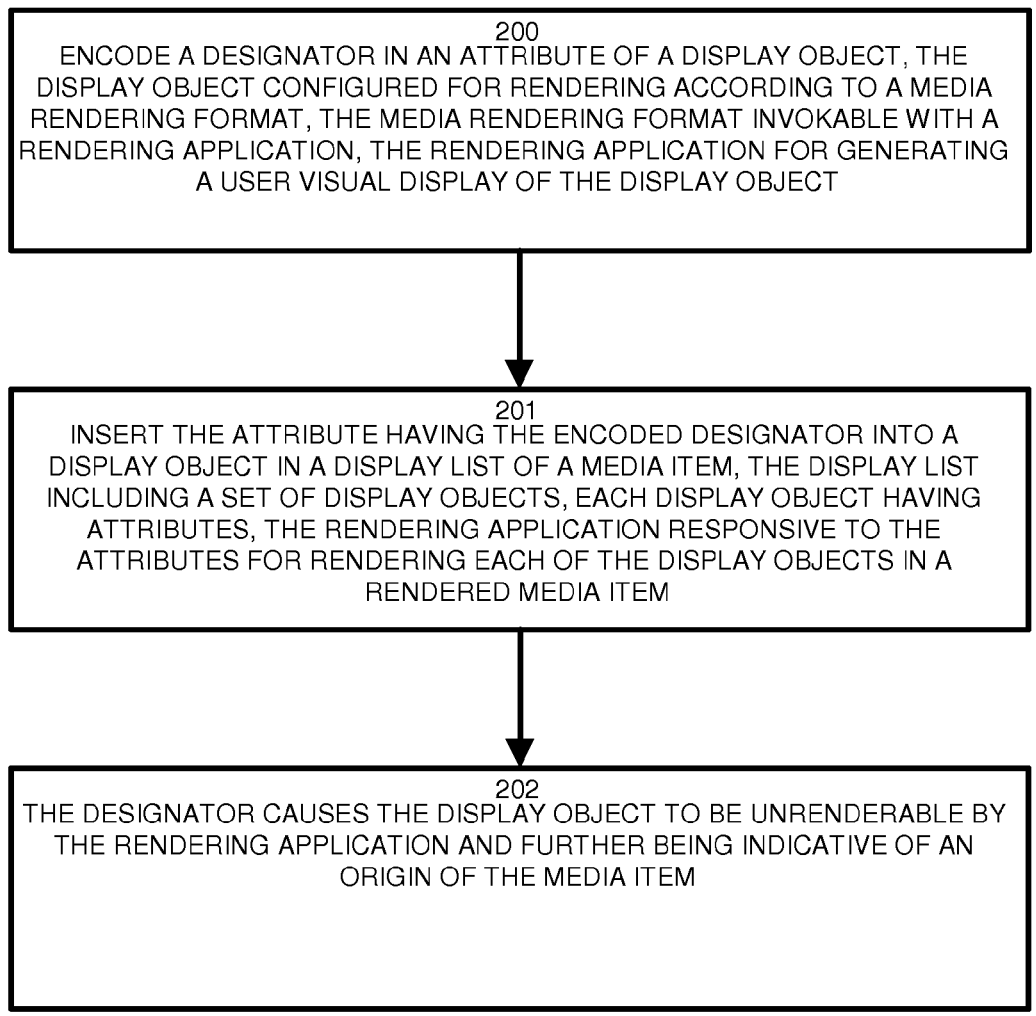
FIG. 2 is a flowchart of an encoded origin designator processing example in the environment of FIG. 1.
Figure 3:
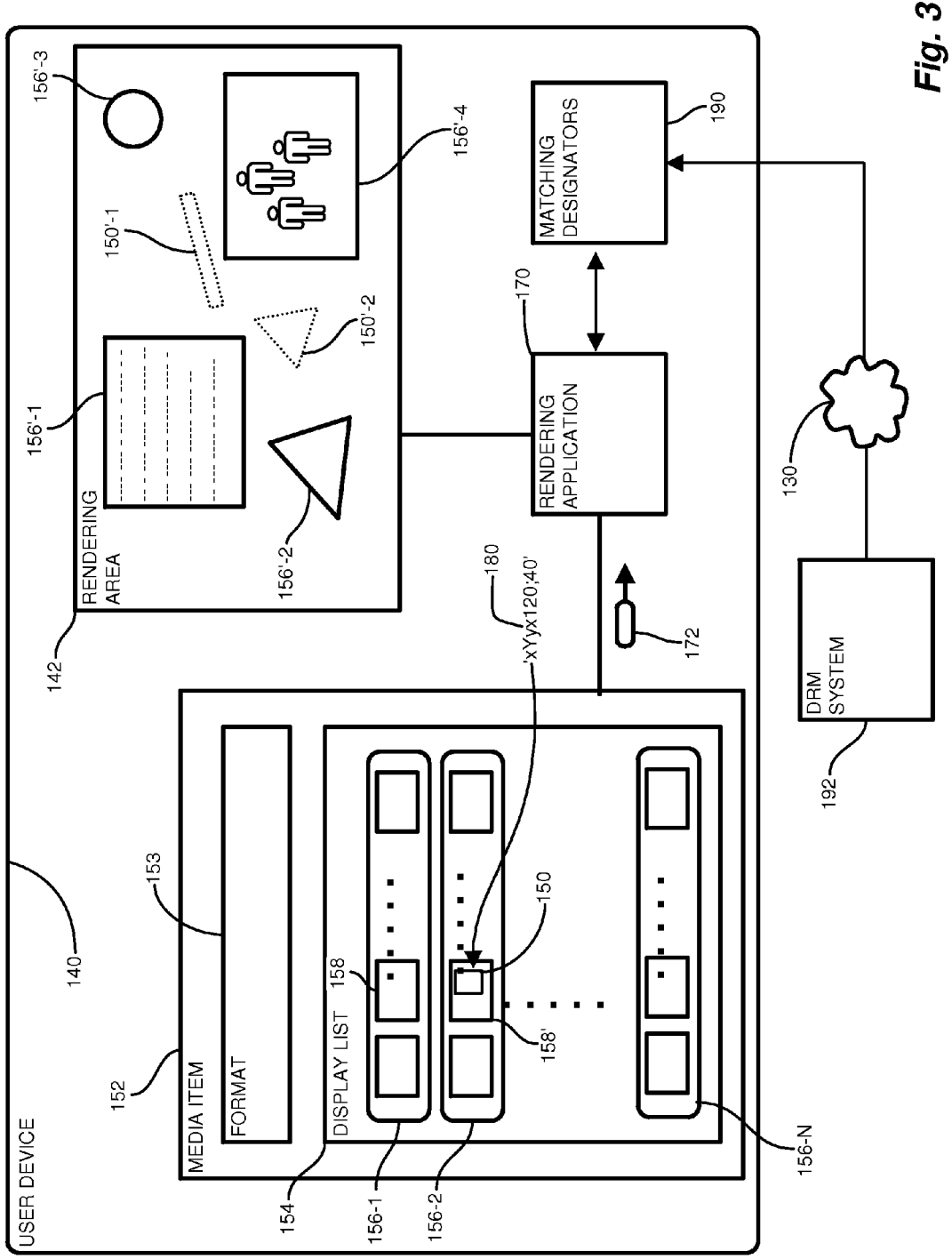
FIG. 3 is a block diagram of encoded origin designator usage in the environment of FIG. 1.

FIG. 2 is a flowchart of an encoded origin designator 150 processing example in the environment of FIG. 1. Referring to FIGS. 1-3, the method for implementing the encoded origin designator 150 includes encoding the designator 150 in an attribute 158 of a display object 156 (FIG. 3, below), in which the display object 156 is configured for rendering according to a media rendering format such as PDF, as depicted at step 200 The media rendering format is invokable with a rendering application 170, such as a PDF reader or other suitable application depending on the format, in which the rendering application 170 is for generating a user visual display of the display object in the rendering area 142.

The server 110 inserts the attribute having the encoded designator 150 into a display object 156 in a display list 154 of the media item, in which the display list includes a set of display objects, as disclosed at step 201. Each display object 156 in the display list has attributes 158, such that the rendering application 170 is responsive to the attributes 158 for rendering each of the display objects 156 in a rendered media item 156'. The attributes 158 include various qualifiers and parameters based on the particular type of media item 152 being rendered. The designator 150 is selected such that it causes the display object to be unrenderable by the rendering application and is further being indicative of an origin of the media item 152, as shown at step 202. In the example configuration discussed further below, at least one of the attributes 158 of a display object causes it to be unrenderable, such as a zero width line or a color matching the background. The attribute itself, or other attributes of the same display object 156, may be written with further encoded information concerning the origin.

FIG. 3 is a block diagram of encoded origin designator 150 usage in the environment 100 of FIG. 1. Referring to FIGS. 1 and 3, in operation, a user device 140 is invoked to render a media item 152 having an encoded designator 150 and receives the media item 152 from a source such as the server 110. The media item 152 includes a format 153 and a display list 154 containing a list of display objects 156-1.156-N (156 generally) for display in the rendering area 142 of the user device 140. Various formats 153 define items 156'-1.156'-4 (156', generally) including documents 156'-1, graphics 156'-2, 156'-3, and video 156'-4. Each display object 156 has one or more attributes 158 for specifying renderable data. The rendering application 170, such as a PDF reader, word processor, or graphics tool, parses or processes the media item 152 to attempt to render display artifacts 172 for each abject 156 as rendered display objects 156' in the rendering area 142. Each of the attributes 158 defines variables or features for physical display in the rendering area 142. The designator 150 takes the form of attributes 158' that result in the display object 156 being unrenderable, that is, not evoking a physical display on the rendering area 142 when processed by the rendering application 170.

Figure 4:
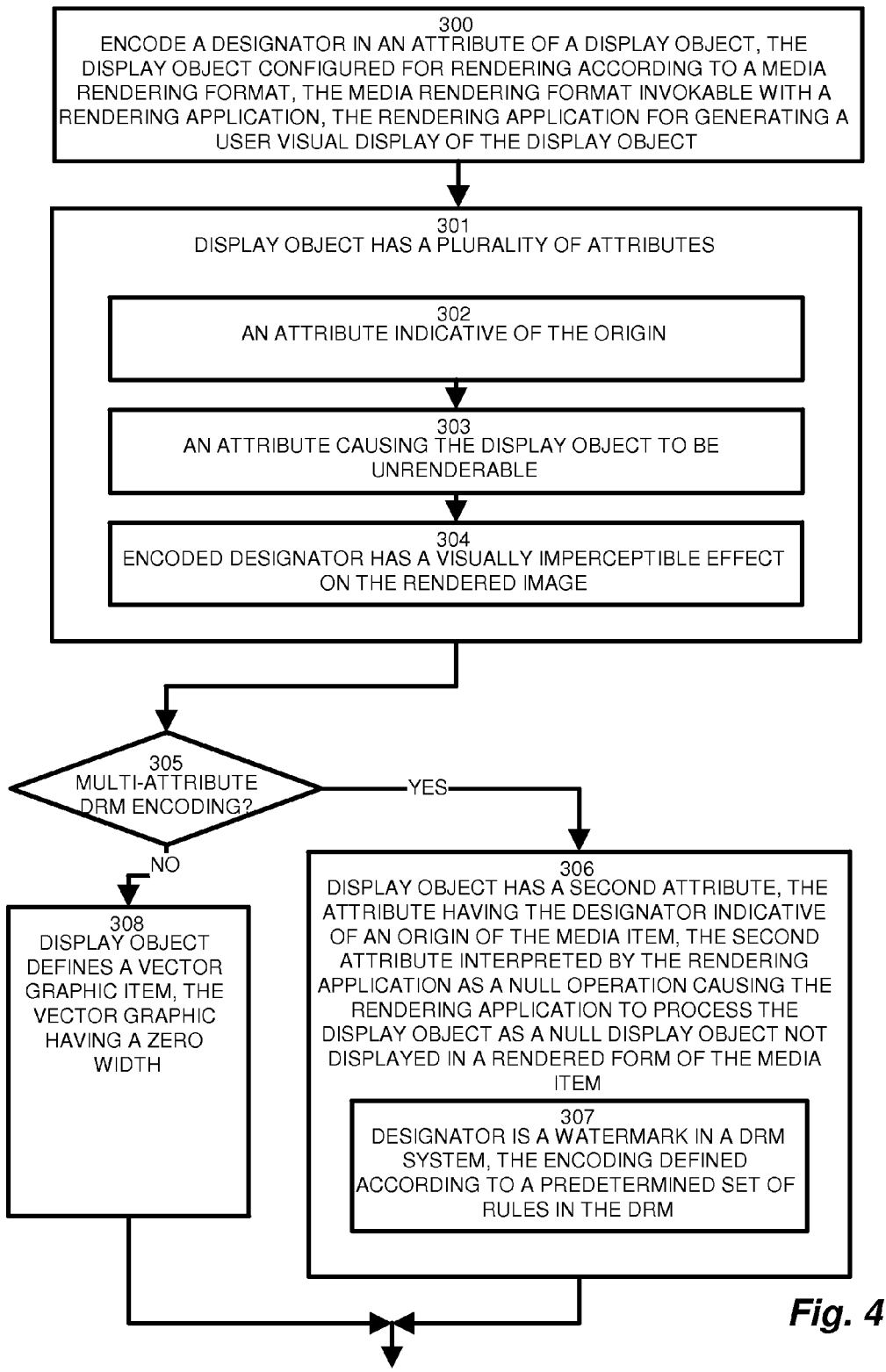
FIGS. 4-6 are flowchart of media item rendering using the encoded origin designator of FIG. 3.
Figure 5:
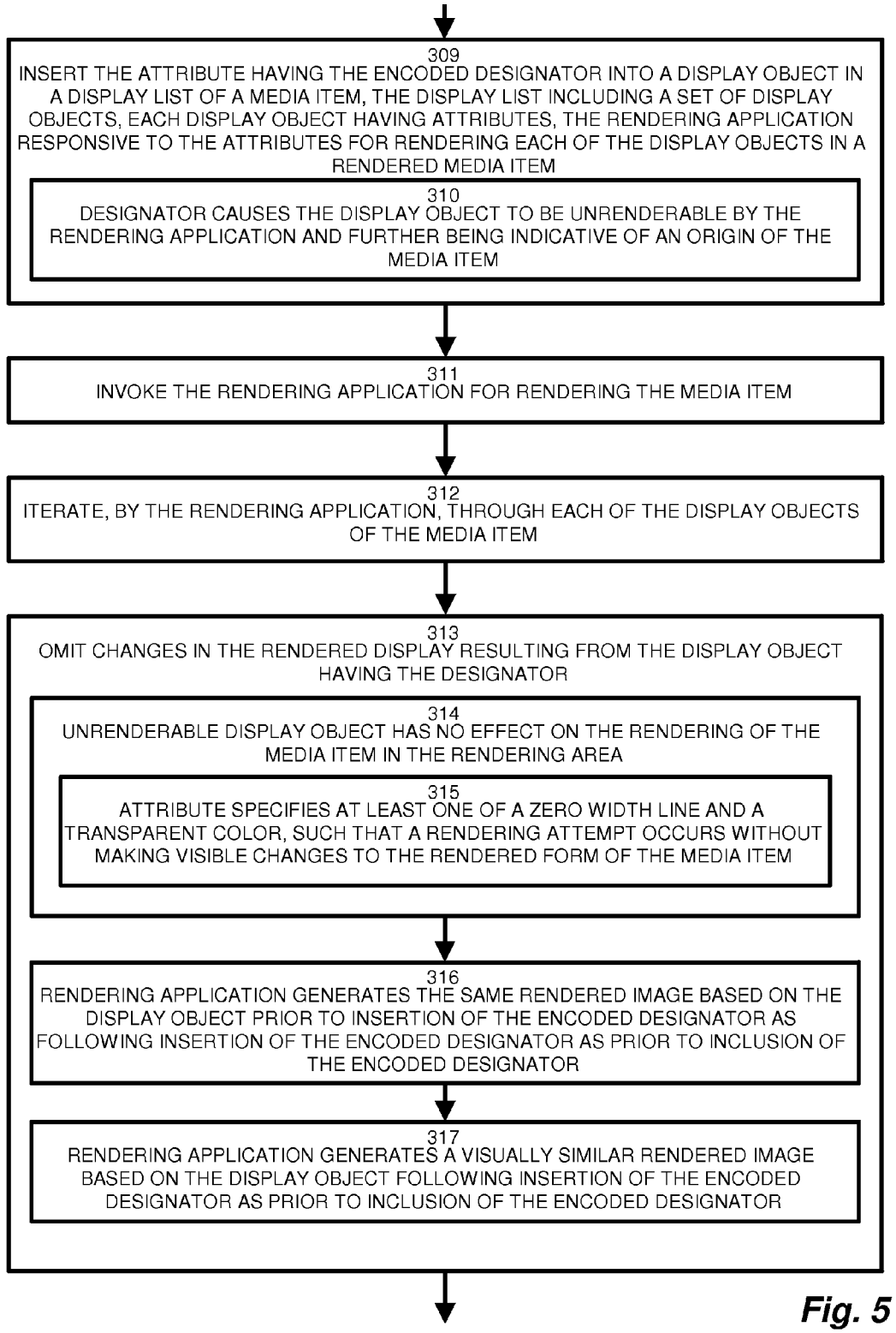
Figure 6:
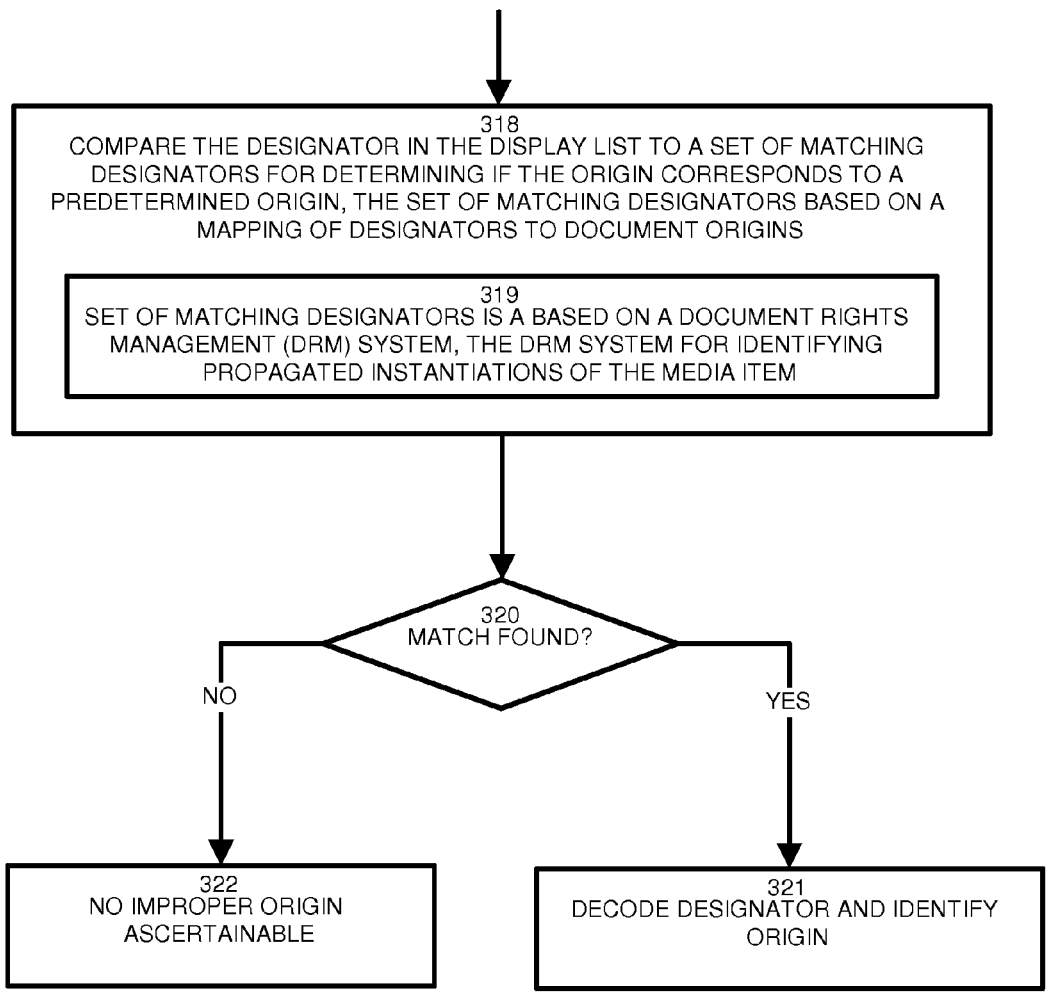

In a document rights management environment, would-be copiers often attempt to obliterate a watermark or other origin indicator to enable unauthorized distribution of copies without the copies bearing signs of origin. One particular feature of the unrendered designator 150' is obscuring the designator 150 in the display list 154 such that it appears similar to other neighboring display objects 156 and is not readily apparent by inspection of the display list 154. For example, in a display list of a PDF file, attributes 158 often take the form of a text list of attribute names followed by digit values 180. A zero value for a line width or a color value that matches the background appears generally similar to other attribute names and values in the typically lengthy display list 154. The unrendered designator 150 is included in attributes 158', such as numeric positions, color and line specifiers, that are similar to other attributes 158 including renderable values. Therefore the unrendered designator 150' may take the form of a zero width line 150'-1, or a FIG. 150'-2 having a color matching the background, shown as dotted lines 150'-1, 150'-2 indicative of where the display object would be rendered but for the designator 150 represented by the unrenderable attribute. Since the unrenderable attribute 158' causes the entire display object 156 to be unrenderable, an encoded string of values 180 may be written to designate additional details about the origin, for example contractual details about the particular instantiation FIGS. 4-6 are a flowchart of media item 152 rendering using the encoded origin designator of FIG. 3 in a DRM system. Referring to FIGS. 1 and 3-6, at step 300, the DRM server 110 encodes the designator 150 in an attribute 158 of a display object 156, in which the display object 156 is configured for rendering according to a media rendering format 153. The media rendering format 153 is invokable with a rendering application 170 for generating a user visual display of the display objects 156 in the rendering area 142. The display object 156 may have a plurality of attributes 158, as shown at step 301 including an attribute indicative of the origin, as shown at step 302, an attribute causing the display object to be unrenderable, as shown at step 303, and an attribute such that the encoded designator 150 has a visually imperceptible effect on the rendered image 156', as depicted at step 304.

The designator 150, as indicated above, may have a simple range of values that merely tag the media item 152, or may be part of a more complex origin identification scheme as in a DRM. Accordingly, a check is performed, at step 305, to determine if multiple attributes for the display object 156 are affected by a designator 150. If multiple attributes 158 are affected, as depicted at step 306, the display object has a second (and possibly additional) attributes having a designator 150 indicative of an origin of the media item 152. In such a scenario, the second attribute may be interpreted by the rendering application 170 as a null operation causing the rendering application to process the display object as a null display object that is not displayed in a rendered form 150' of the media item 152. If the DRM encoding scheme calls for a value string 180, for example, a single attribute 158 may not have a broad enough range of values to encompass the encoded value string 180. However, since a single unrenderable attribute 158' results in the entire display object 156 being unrenderable, other attributes 158 are then available to store the value 180 for the encoded designator 150. In such an approach, the designator 150 may be a watermark in a DRM system, such that the encoding is defined according to a predetermined set of rules of the DRM, as depicted at step 307. Otherwise, at step 308, the display object 156 may define a vector graphic item or other simple artifact 172, such that the vector graphic having a zero width or background color.

The server 110 inserts or writes the attribute 158' having the encoded designator 150 into a display object 156 in a display list 154 of a media item 152 prior to dissemination to a user, as shown at step 309. The display list 154 typically includes a set of display objects 156-N, such that each display object 156 has attributes 158, in which the rendering application 170 is responsive to the attributes 158 for rendering each of the display objects 156 in a rendered media item 156'. In the example configuration, the encoded designator 150 appears among many attributes 158 in the display list 154, thus avoiding detection via casual inspection, while the designator 150 nonetheless causes the display object 156 to be unrenderable by the rendering application 170 and further is indicative of the origin of the media item 152, as depicted at step 310.

Following dissemination of the media item 152 through typical channels, such as a website sale, transmission, or physical media distribution, an end user 146 invokes the rendering application 170 for rendering the media item 152 on the user device 140, as depicted at step 311. The rendering application 170 performs processing by iterating through each of the display objects 156 in the display list 154 of the media item 152, as shown at step 312. Upon attempting to render a display object 156 having the designator 150, the rendering application 170 omits any changes in the rendered display resulting from the display object 156 having the designator 150, as depicted at step 313.

As indicated above, one or more of the attributes 158' is such that the display object 156-2 (in the example shown) is not shown or visible on the rendering area 142, thus the unrenderable display object 156 has no effect on the rendering of the media item 152 in the rendering area, as disclosed at step 314.

In the example shown, the attribute 158' may specify at least one of a zero width line and a transparent color, such that a rendering attempt occurs without making visible changes to the rendered form 150' of the media item 152 resulting from the display object 156 having the designator 150, as depicted at step 315. The rendering application 170 therefore generates the same rendered image based on the display object 156 prior to insertion of the encoded designator 150 as following insertion of the encoded designator 150, as depicted at step 316. In other words, the rendering application 170 generates a visually similar rendered image 156' based on the display object 156 following insertion of the encoded designator 150 as prior to inclusion of the encoded designator 150 due to the unrenderable, or nullification effect, of the attribute 150 which causes a zero width line, background color field, or other visual attribute having such an effect, as disclosed at step 317.

Origin identification of instantiations (copies) is performed by comparing the designator 150 in the display list 154 to a set of matching designators 190 for determining if the origin corresponds to a predetermined origin, as depicted at step 318, such that the set of matching designators 190 is based on a mapping of designators 150 to document origins, such as those provided from the DRM system 192. In the example arrangement, the set of matching designators 190 is therefore based on a DRM system for identifying propagated instantiations of the media item, as disclosed at step 319. Upon subsequent comparison, at step 320, if a match is found, then the DRM system 192 or rendering application 170 decodes the designator 150 and identifies the origin. Alternatively, a lack of a matching designator indicates no watermarking or origin designation recognized by the DRM 192, as depicted at step 322.

Those skilled in the art should readily appreciate that the programs and methods for encoding origin designators as defined herein are deliverable to a user processing and rendering device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for encoding origin designators has been particularly shown and described with references to embodiments thereof, it will be understood by those skilled in the art that various changes in form and details may be made therein without departing from the scope of the invention encompassed by the appended claims.

What is claimed is:

1. A method comprising:
    accessing, by a processor, a display list of a media item, wherein the display list comprises a plurality of display objects of the media item, wherein each display object of at least two of the plurality of display objects has a respective first attribute controlling a first display characteristic of the display object and a respective second attribute controlling a second display characteristic of the display object;
    selecting, by the processor, display object from the at least two of the plurality of display objects;
    encoding, by the processor, a designator in a first attribute of the selected display object, wherein the designator is indicative of an origin of the media item; and
    modifying, by the processor, a second attribute of the selected display object to have a respective value preventing the processing of the selected display object from resulting in the selected display object having any displayable feature, wherein modifying the second attribute of the selected display object to have the respective value comprises setting the respective value of the second attribute to a null value, the null value causing the second attribute to be interpreted by the rendering application as a null operation and causing the selected display object to be processed by the rendering application as a null display object not displayed in a rendered instance of the media item.

2. The method of claim 1, further comprising
    invoking a rendering application configured for rendering the media item;
    generating a rendered instance of the media item by iterating, by the rendering application, through each of the plurality of display objects of the media item; and
    omitting changes in the rendered instance of the media item resulting from the selected display object having the designator.

3. The method of claim 2 wherein the designator being encoded in the selected display object has a visually imperceptible effect on the rendered instance of the media item.

4. The method of claim 2, further comprising:
    comparing the designator to at least one of a set of matching designators; and
    determining, based on comparing the designator, that the origin corresponds to a predetermined origin, wherein the set of matching designators is based on a mapping of designators to document origins.

5. The method of claim 4 wherein the set of matching designators is a based on a document rights management (DRM) system, the DRM system for identifying propagated instantiations of the media item.

6. The method of claim 1, wherein encoding the designator in the first attribute of the selected display object does not prevent a rendering application from rendering any other display object of the plurality of display objects.

7. The method of claim 1, wherein the selected display object being prevented from having any displayable feature is controlled only by the respective value of the second attribute.

8. The method of claim 1, wherein the selected display object being prevented from having any displayable feature comprises modifying the respective value of the second attribute of the selected display object such that no rendering operations are performed on the selected display object.

9. The method of claim 1, further comprising:
invoking a rendering application configured for rendering the media item;
rendering, by the rendering application, a first display object of the plurality of display objects based on a first attribute of the first display object and a second attribute of the first display object;
preventing, by the rendering application, the rendering of the selected display object based on the respective value of the second attribute of the selected display object; and
subsequent to preventing the display of the selected display object, rendering, by the rendering application, a second display object of the plurality of display objects based on a first attribute of the second display object and a second attribute of the second display object such that a rendered instance of the media item includes the first display object and the second display object.

10. A computer program product comprising a non-transitory computer readable storage medium encoded as a set of processor-based instructions executable by a processor, the set of processor-based instructions comprising:
program code for accessing a display list of a media item, wherein the display list comprises a plurality of display objects of the media item, wherein each display object of at least two of the plurality of display objects has a respective first attribute controlling a first display characteristic of the display object and a respective second attribute controlling a second display characteristic of the display object;
program code for selecting a selected display object from the at least two of the plurality of display objects;
program code for encoding a designator in a first attribute of the selected display object, wherein the designator is indicative of an origin of the media item; and
program code for modifying a second attribute of the selected display object to have a respective value causing the selected display object to be unrenderable by preventing the processing of the selected display object from resulting in the selected display object having any displayable feature, wherein modifying the second attribute of the selected display object to have the respective value comprises setting the respective value of the second attribute to a null value, the null value causing the second attribute to be interpreted by the rendering application as a null operation and causing the selected display object to be processed by the rendering application as a null display object not displayed in a rendered instance of the media item.

11. The computer program product of claim 10, wherein the set of processor-based instructions further comprises:
program code for invoking a rendering application configured for rendering the media item;
program code for generating a rendered instance of the media item by iterating, by the rendering application, through each of the plurality of display objects of the media item; and
program code for omitting changes in the rendered instance of the media item resulting from the selected display object having the designator.

12. The computer program product of claim 11, wherein the set of processor-based instructions further comprises:
program code for comparing the designator to at least one of a set of matching designators; and
program code for determining, based on comparing the designator, that the origin corresponds to a predetermined origin, wherein the set of matching designators is based on a mapping of designators to document origins.

13. The computer program product of claim 12, wherein the set of matching designators is a based on a document rights management system, the document rights management system configured for identifying propagated instantiations of the media item.

14. A computer system comprising:
a processor configured to execute instructions encoded in a non-transitory computer-readable medium to execute one or more operations comprising:
accessing a display list of a media item, wherein the display list comprises a plurality of display objects of the media item, wherein each display object of at least some of the plurality of display objects has a respective first attribute controlling a first display characteristic of the display object and a respective second attribute controlling a second display characteristic of the display object;
selecting a display object from the at least two of the plurality of display objects;
encoding a designator in a first attribute of the selected display object, wherein the designator is indicative of an origin of the media item; and
modifying a second attribute of the selected display object to have a respective value causing the selected display object to be unrenderable by preventing the processing of the selected display object from resulting in the selected display object having any displayable feature, wherein modifying the second attribute of the selected display object to have the respective value comprises setting the respective value of the second attribute to a null value, the null value causing the second attribute to be interpreted by the rendering application as a null operation and causing the selected display object to be processed by the rendering application as a null display object not displayed in a rendered instance of the media item.

* * * * *